US007636922B2

(12) United States Patent
Odins-Lucas et al.

(10) Patent No.: US 7,636,922 B2
(45) Date of Patent: Dec. 22, 2009

(54) GENERIC USER INTERFACE COMMAND ARCHITECTURE

(75) Inventors: Zeke B. Odins-Lucas, Seattle, WA (US); Marc M. Miller, Redmond, WA (US); Paul A. Gusmorino, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 997 days.

(21) Appl. No.: 10/838,462

(22) Filed: May 3, 2004

(65) Prior Publication Data

US 2005/0246725 A1 Nov. 3, 2005

(51) Int. Cl.
*G06F 9/44* (2006.01)
*G06F 17/00* (2006.01)

(52) U.S. Cl. .................................. 719/328; 707/102
(58) Field of Classification Search .......... 719/328, 719/310, 311; 707/102; 715/734, 746, 747, 715/765, 853
See application file for complete search history.

(56) References Cited

U.S. PATENT DOCUMENTS

| 5,457,797 | A | * | 10/1995 | Butterworth et al. | ........ 719/320 |
| 5,664,133 | A | | 9/1997 | Malamud et al. | |
| 6,292,827 | B1 | * | 9/2001 | Raz | ............................ 709/217 |
| 6,583,798 | B1 | | 6/2003 | Hoek et al. | |
| 6,587,129 | B1 | * | 7/2003 | Lavendel et al. | ............ 715/776 |
| 6,611,878 | B2 | | 8/2003 | De Armas et al. | |
| 6,628,305 | B1 | | 9/2003 | Hong et al. | |
| 6,694,482 | B1 | * | 2/2004 | Arellano et al. | ............ 715/251 |
| 6,697,088 | B1 | | 2/2004 | Hollander | |
| 6,957,390 | B2 | * | 10/2005 | Tamir et al. | .................. 715/744 |
| 7,234,111 | B2 | * | 6/2007 | Chu et al. | .................... 715/251 |
| 7,263,551 | B2 | * | 8/2007 | Belfiore et al. | ............... 709/219 |
| 7,266,773 | B2 | * | 9/2007 | Dorwart | ....................... 715/731 |
| 2003/0063120 | A1 | * | 4/2003 | Wong et al. | .................. 345/746 |
| 2003/0066047 | A1 | | 4/2003 | Watase | |
| 2003/0067485 | A1 | * | 4/2003 | Wong et al. | .................. 345/747 |
| 2003/0067489 | A1 | * | 4/2003 | Wong et al. | .................. 345/765 |
| 2003/0070061 | A1 | * | 4/2003 | Wong et al. | .................. 712/220 |

FOREIGN PATENT DOCUMENTS

| EP | 0606718 | A2 | 7/1994 |
| EP | 1343080 | A2 | 9/2003 |
| WO | WO2004031937 | A1 | 4/2004 |

OTHER PUBLICATIONS

"Coupling A UI Framework with Automatic Generation of Context-Sensitive Animated Help", Sukaviriya et al., Proceedings of the ACM SIGGRAPH Symposium, Oct. 1990, pp. 152-166.

(Continued)

*Primary Examiner*—Van H Nguyen
(74) *Attorney, Agent, or Firm*—Lee & Hayes, PLLC (57) ABSTRACT

Certain aspects of a generic user interface command architecture allow an application to host commands for presentation on a computing device. The commands can be written by the same designer or author as the application, or alternatively by other parties (e.g., by a third-party developer). Other aspects of the generic UI command architecture describe an application programming interface (API) that can be used to allow the application to host the commands. Other aspects of the generic UI command architecture describe an activation mechanism by which registered commands can be activated by an application.

17 Claims, 6 Drawing Sheets

OTHER PUBLICATIONS

"A Web browser-based multimodal interface for netshopping", Journal of Computer Aided Design & Computer Graphics, vol. 13, No. 2, Feb. 2001, pp. 168-172.

Supplementary European Search Report for Application No. EP04778935 mailed Oct. 2, 2009, 3 pgs.

* cited by examiner

GENERIC USER INTERFACE COMMAND ARCHITECTURE

TECHNICAL FIELD

This invention relates to computers and user interfaces, and particularly to a generic user interface command architecture.

BACKGROUND

As computer technology has advanced and evolved, so too have the user interfaces (UIs) that computers present to users. Graphical user interfaces (GUIs) have become commonplace, resulting in user interfaces that are typically easier for users to interact with. Many different presentation models can be used with GUIs that allow command options to be presented to users in different ways, such as menus, toolbars, buttons, links, and so forth.

One problem faced when designing such GUIs is the different presentation models that can be used with the GUIs. Typically, a provider of a command must write a separate description and interface for each different presentation model supported by the GUI that the command is to be included in. This results in additional and duplicative work on the part of the provider of the command. Additional problems can result in situations where new presentation models are developed subsequent to the provider writing the command— as the provider writing the command does not know of the new presentation model, he or she typically cannot write the command to support the new presentation model.

Thus, it would be beneficial to have a way to implement commands that reduces these problems.

SUMMARY

A generic user interface command architecture is described herein.

In accordance with certain aspects, a generic architecture is described that allows an application to host commands for presentation on a computing device. The architecture includes a command host and a command broker. The command host provides a workspace where a plurality of user interface commands can be presented. The command broker identifies a plurality of supported modes for a command, and further negotiates with the command host to determine which of the plurality of supported modes is to be used for the command.

In accordance with certain aspects, an application programming interface (API) is described that can be used to allow the application to host the commands. The API includes, for example, a command broker component that exposes a modes enumeration. In response to a requester, such as a command host, invoking the modes enumeration, the command broker component returns a list of a plurality of different presentation models supported by the component for a particular command associated with the component.

In accordance with certain aspects, an activation mechanism is discussed that describes a way in which commands can be registered for activation by an application. The activation mechanism creates a command broker by identifying an object definition that includes one or more arguments. For each of the one or more arguments that is a non-literal argument, one or more additional object definitions based on the argument are recursively identified. The command broker is then created as the objects defined by the identified object definitions.

BRIEF DESCRIPTION OF THE DRAWINGS

The same numbers are used throughout the document to reference like components and/or features.

DETAILED DESCRIPTION

A generic user interface command architecture is described herein. In accordance with certain aspects, a generic architecture is described that allows an application to host commands for presentation on a computing device. The commands can be written by the same designer or author as the application, or alternatively by other parties (e.g., by a third-party developer). Additionally, an application programming interface (API) is described that can be used to allow the application to host the commands. Furthermore, an activation mechanism is discussed that describes a way in which commands can be registered for activation by an application.

General UI Command Architecture

Figure 1:
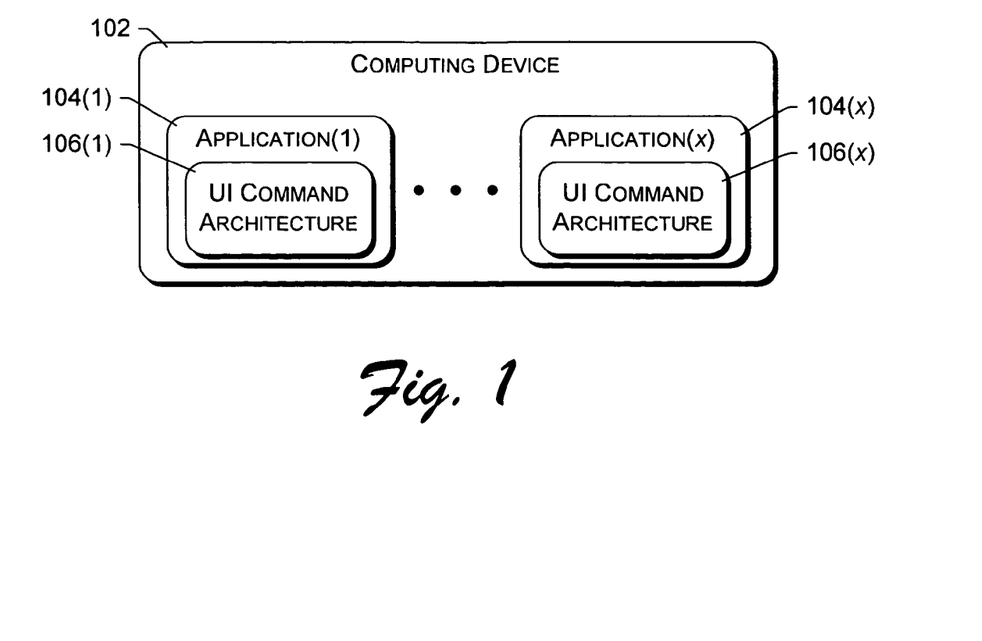
FIG. 1 illustrates an example computing device in which the generic user interface command architecture is used.

FIG. 1 illustrates an example computing device 102 in which the generic user interface command architecture is used. Computing device 102 includes multiple (x) applications 104 each supporting a generic UI command architecture 106. UI command architecture 106 allows an application 104 to host different commands in a generic way, as discussed in more detail below. The commands can be authored by the same party (or parties) as authored the applications 104, or alternatively by different parties.

Computing device 102 represents any of a variety of different devices having a processor or controller that presents a user interface. Examples of such devices include a desktop computer, server computer, notebook computer, handheld or portable computer, entertainment device, game console, personal digital assistant (PDA), cellular or mobile telephone, and so forth. Applications 104 represent any of a variety of applications. Examples of such applications include operating systems, recreational programs, utility programs, educational programs, productivity programs, financial programs, and so forth.

Figure 2:
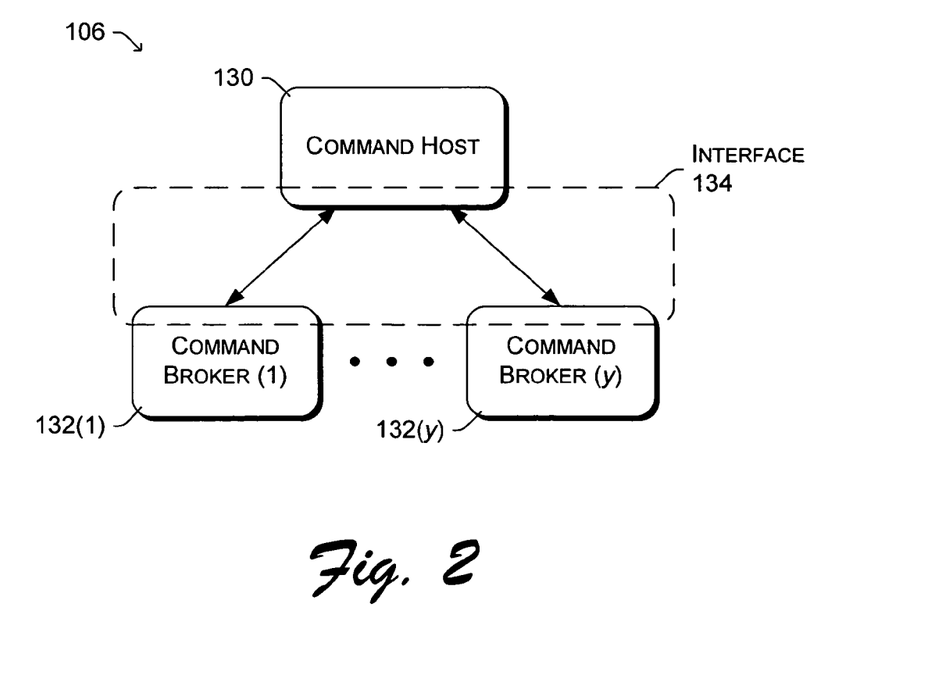
FIGS. 2 and 3 each illustrate an example generic UI command architecture in additional detail.

FIG. 2 illustrates an example generic UI command architecture 106 in additional detail. The command architecture 106 includes a command host 130 and multiple (y) command brokers 132. Any number of command brokers 132 can be included in command architecture 106. Additionally, although multiple command brokers 132 are illustrated in FIG. 2, alternatively only a single command broker may be included in command architecture 106.

Command architecture 106 is referred to as a UI command architecture because the architecture 106 is designed for use with UI commands, which are commands that are presented for user selection via the UI. Command architecture 106 allows commands to be authored or written for presentation to, and selection by, a user via a user interface. Any type of commands can be supported by command architecture 106, such as commands to access resources (e.g., such as a file, storage device, input device, output device, etc.), commands to present content to a user (e.g., play back an audio file or an audio/video file, print out a hard copy of data, etc.), commands to allow the user to navigate to particular locations (e.g., files, network locations, control panels, etc.), and so forth.

Command host 130 is at least a portion of any application (such as an application 104 of FIG. 1) that provides a shell or workspace where commands can be placed for presentation. A command host can provide a single such shell or workspace, and multiple different command hosts can concurrently provide different shells or workspaces. Examples of such workspaces include a window or other portion of a display, an audible list, and so forth.

Command host 130 supports one or more modes, also referred to as one or more presentation models, for the presentation of commands. These different modes or presentation models refer to different ways in which commands can be presented to a user via a user interface. Examples of modes or presentation models include menus, menu lists, context menus, task bars, buttons, links (e.g., hyperlinks), and so forth. These different modes or presentation models typically include displaying commands visually, such as in a GUI, although other manners of presentation may also be used (e.g., presenting commands audibly).

Each command broker 132 is an intermediary that sits between command host 130 and a final handler for the command (referred to as a command provider, as discussed in more detail below). Each command broker 132 is associated with a particular command. Command broker 132 enumerates the modes that are supported by the command and negotiates with command host 130 as to which mode will be used for the command. If a particular mode is supported by command broker 132, then command broker 132 can create and give to command host 130 a particular command provider associated with the mode. This negotiation is performed via an interface 134. In certain embodiments, an application programming interface (API) is exposed by each command broker 132. This API can be called by command host 130 during the negotiation process. An example of such an API is discussed in more detail below.

UI command architecture 106 is referred to as generic because of this negotiation process and the variety of modes that a single command broker can support for its associated command. The same command broker can be used to allow the command to be presented in a variety of different presentation models, and thus can be viewed as generic.

Command host 130 negotiates with command broker 132 each time execution of the command host begins. Different command brokers 132 can be made accessible to command host 130, allowing their associated commands to be presented via the UI by command host 130. One way in which command brokers 132 can be made accessible to command host 130 is by way of a command broker activation mechanism, discussed in more detail below. Command host 130 may also negotiate with command broker 132 at different times, such as whenever there is a change in selection (e.g., which item(s) in the UI are selected), whenever there is a change in the context of the command, such as a change in the type of UI (e.g., a change from a visual to an audible UI), a change in the format of the UI (e.g., a window being resized), a change in the content of the UI (e.g., a different application being executed from a command host that is an operating system), and so forth.

As an example of this negotiation, assume that an application may present a user interface having both menu and button modes. In this example, command host 130 would negotiate with command broker 132 to determine which of the two modes (menu and/or button) to use. Assume that command broker 132 is associated with the print command, which generates a hard copy of selected data using a printer. Further assume that command broker 132 supports the button mode as well as a list mode. Command host 130 would negotiate with command broker 132 and determine that the only mode that both host 130 and broker 132 support is the button mode (broker 132 does not support the menu mode, and host 130 does not support the list mode). Thus, the negotiation would result in selection of the button mode.

It should be noted that in certain embodiments command host 130 may support additional modes than those supported by command broker 132. Additionally, command host 130 may have access to a program or other resource that can convert commands from one mode to another. Following the preceding example, command host 130 may have access to a program that can convert the information for a command in button mode to be useable for a command in menu mode. Thus, during the negotiation process command host 130 can select the button mode, and then convert the information received regarding the print command in button mode into menu mode. Such a process allows, for example, command broker 132 to be used with modes that are created after generation of command broker 132 and that command broker 132 had no knowledge of.

It should also be noted that command broker 132 can enumerate its modes in different orders. In certain embodiments, command broker 132 enumerates its modes in order of preference (e.g., the order in which command broker 132 or the author of command broker 132 would prefer that the modes are selected by command host 130). However, in certain implementations command host 130 can choose to ignore the order preferred by command broker 132. Other orderings could alternatively be used, such as a random order, alphabetical order, and so forth.

Command broker 132 can also enumerate different groups of commands. These groups are an indication to command host 130 that particular commands should be located close to one another. Typically, in certain embodiments command host 130 is not required to follow the guidance provided by these indications, but oftentimes tries to follow the guidance.

In certain embodiments, command broker 132 may also be a container for one or more other command brokers. For example, a command broker may support one presentation mode which is a menu item, in which the command would be presented as a single menu item in the UI. The command broker may also support a presentation mode which is a menu list, in which the command broker is a container for multiple additional command brokers, each of which is displayed in a list of menu items in the UI.

Figure 3:
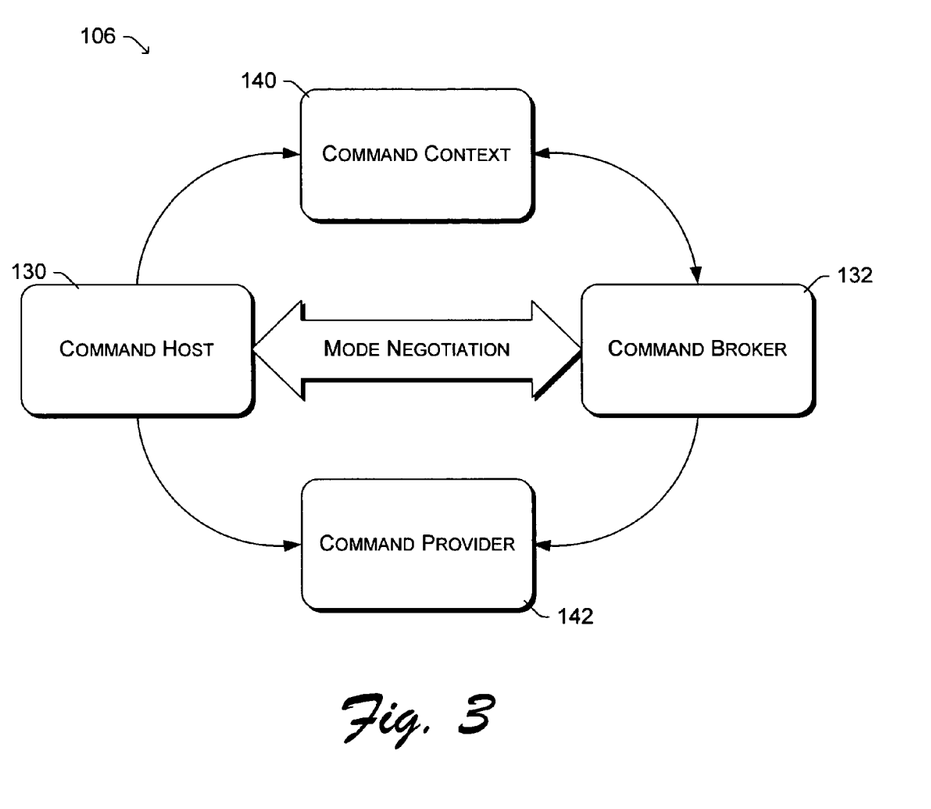

FIG. 3 illustrates an example generic UI command architecture 106 in additional detail. Command host 130 negotiates a mode(s) with command broker 132 as discussed above. Additionally, a command context 140 and command provider 142 are illustrated in FIG. 3. In certain embodiments, each of command host 130, command broker 132, command context 140, and command provider 142 are communicatively coupled to one another, allowing them to communicate with one another. In certain implementations, each of command host 130, command broker 132, command context 140, and command provider 142 is an object, and can invoke methods, enumerations, properties, etc. of the others.

Command provider 142 is the final handler for the particular command. Command provider 142 controls the various actions that are followed when a command is invoked (e.g., the actions involved in response to user-selection of a command, such as a print command). Command provider 142 typically contains the instructions that are executed whenever the particular command is invoked. Command provider 142 is an object that is instantiated by command broker 132 upon completion of the mode negotiation with command host 130. A different command provider is associated with each mode supported by command broker 132. Thus, when the mode negotiation has resulted in a particular mode(s), command broker 132 instantiates an object for that particular mode(s). The instantiated object is also passed to command host 130, allowing command host 130 to interact with command provider 142.

It should be noted that in certain situations command host 130 may negotiate with command broker 132 for multiple presentation models or modes. In such situations, command broker 132 instantiates multiple command providers 142, one for each of the multiple presentation models or modes, and passes each such instantiated command provider 142 to command host 130.

In alternate embodiments, command broker 132 may be combined with one or more command providers 142. In such embodiments, a separate command provider 142 need not be instantiated. Rather, after command host 130 negotiates the mode with command broker 132, command host 130 can interact with command host 130 as the final handler for the command rather than a command provider 142.

Command context 140 is a list of context information that is supplied by command host 130 and that can be accessed by command broker 132. The context information included in command context 140 can vary. The context information refers to, for example information describing the user interface, information describing command host 130, information describing what is currently being displayed and/or how it is being displayed in the user interface, information about available resources, and so forth. Specific examples of context information include what items (if any) being presented in the UI are currently selected, the size (e.g., in pixels) of the area in which commands will be located, whether a particular item or feature is currently being presented in the UI, whether particular resources are available on the computing device, what other components the computing device is coupled to (e.g., whether a printer is currently coupled to the computing device), and so forth. Different command brokers 132 may be interested in different context information, and some command brokers 132 may not be interested in any context information. When a particular command broker 132 desires to be aware of particular context information, the particular command broker 132 will interact with command context 140 to obtain the desired context information.

It should also be noted that the presentation models supported by command broker 132 may change based on command context 140. For example, command broker 132 may support one particular presentation model in situations where a particular component (such as a printer, personal audio player, speaker, etc.) is coupled to the computing device, but not support that particular presentation model in situations where the particular component is not coupled to the computing device. By way of another example, command broker 132 may support different presentation models based on the size of the workspace provided by command host 130.

The generic UI command architecture 106 facilitates authoring of commands. One way in which this facilitation is accomplished is by using command broker 132. Rather than requiring the author to register the same command multiple different times for multiple different presentation models, all of the handlers for the command can be accessed via the same command broker 132. Additionally, common functionality such as a display name or icon to be displayed for the command, or the invocation action to be taken when the user selects the command, can be shared for different modes. This sharing can be accomplished, for example, by each command provider 142 referring to the same object that contains the set of instructions that are executed when the command associated with the command provider 142 is selected by a user. Alternatively, some common functionality can be made available to command host 130 by command provider 132, rather than being implemented in or accessed through the associated command provider 142.

Figure 4:
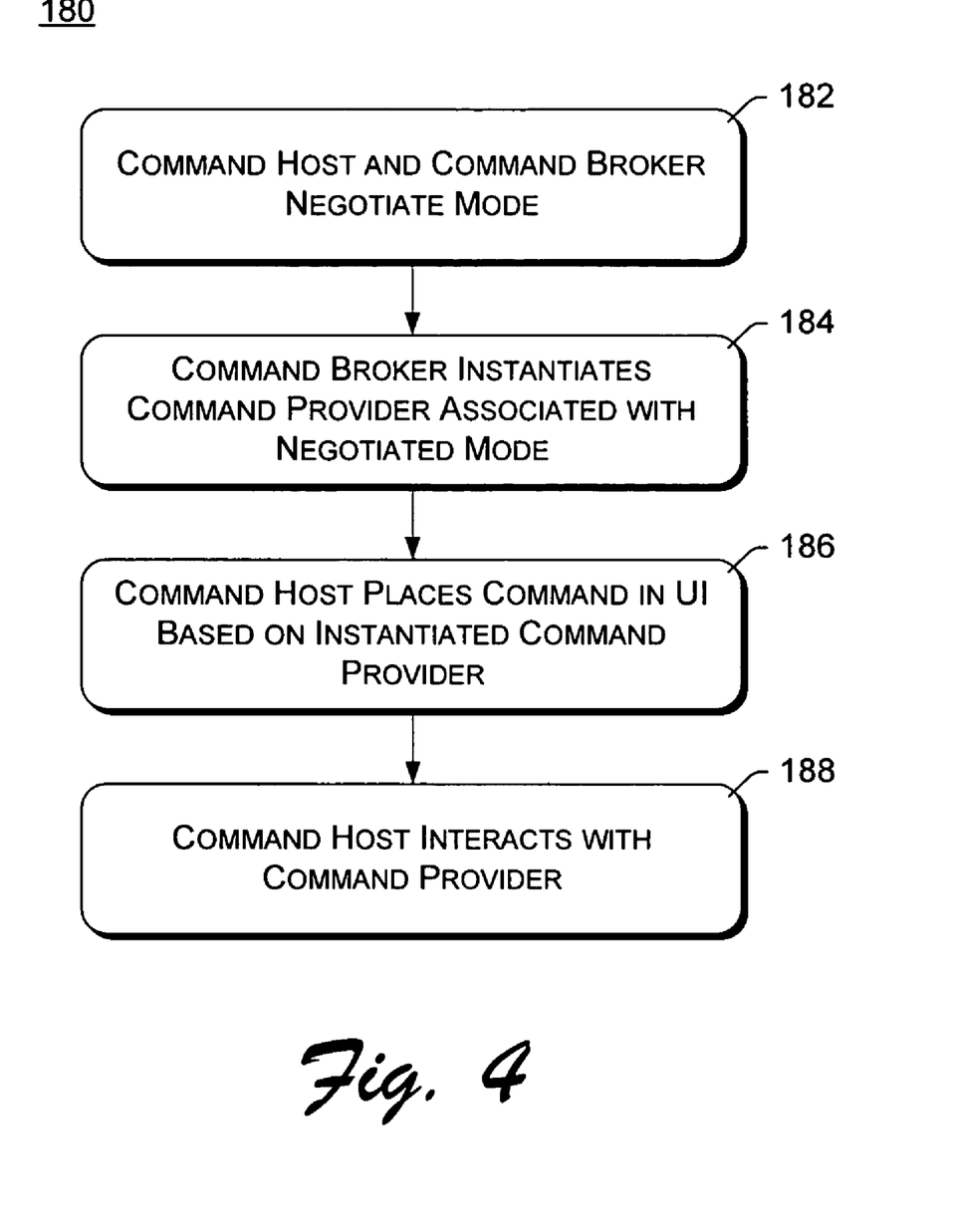
FIG. 4 is a flowchart illustrating an example process for presenting a command using the generic UI command architecture.

FIG. 4 is a flowchart illustrating an example process 180 for presenting a command using the generic UI command architecture 106. Process 180 is performed in software, although alternatively aspects of process 180 may be performed in firmware, hardware, or a combination of firmware, hardware, and/or software.

Initially, the command host and the command broker negotiate a mode (act 182). In certain embodiments, this negotiation is performed by the command broker identifying the modes it supports to the command host, and the command host comparing those modes to the modes that the command host supports, and then the command host selecting one of the modes that both the command host and the command broker support. Alternatively, this negotiation may take other forms in other embodiments. For example, the command host may identify the modes it supports to the command broker, and the command broker compare those modes to the modes that the command broker supports, and then the command broker selecting one of the modes that both the command host and command broker support. By way of another example, the command host may go through the list of modes that it supports and, for each such mode, query the command broker as to whether the command broker supports the mode—as soon as the command host identifies one of the modes that it supports that is also supported by the command broker, the command host can stop querying the command broker.

Once the mode is negotiated, the command broker instantiates or otherwise creates a command provider associated with the negotiated mode (act 184). In certain implementations, the command provider is instantiated by the command host invoking a GetProvider method exposed by the command broker. The GetProvider method is discussed in additional detail below.

The command host then places the command in the user interface based on the command provider instantiated or otherwise created in act 184 (act 186). This placing of the command refers to positioning an icon, name, and/or other identifier of the command in the user interface. As discussed above, the negotiated mode may not be the mode actually used by the command host for presentation of the command (rather, the command host may use the information obtained from the command provider for the negotiated mode to present the command using a different mode).

The command host then interacts with the command provider (act 188). This interaction includes, for example, presenting the command's user interface as well as invoking the command's behavior as appropriate (e.g., in the event of a user invoking the command).

Example API Implementation

The following is an example API that implements the generic UI command architecture 106 discussed above.

A ProviderCategory and ContextObjectDescription are listed in Table I. The ContextObjectDescription serves as the name for an individual piece of context data, held by the CommandContext object and provided by the host. The ProviderCategory is used to determine the volatility of the context data described. A volatile context value leaves the command context when any host context value is changed. A nonvolatile value stays in the context.

TABLE I

```
public enum ProviderCategory
{
    Host,
    Nonvolatile,
    Volatile
}
public class ContextObjectDescription
{
    public virtual ProviderCategory ProviderCategory { get; }
        Retrieves the provider category for the piece of context
        information represented by this ContextObjectDescription.
        The provider category helps the CommandContext manage
        the lifetime of this context value. If the category is
        volatile, then the context erases the value whenever some
        host value is set. If the category is nonvolatile, the value
        is not removed from the context.
    public ContextObjectDescription(ProviderCategory
providerCategory);
        Constructs a ContextObjectDescription.
}
```

A ContextObjects class is listed in Table II. In certain embodiments, a predefined set of ContextObjectDescriptions are kept in the ContextObjects static class. The CommandContext can also hold an extensible set of ContextObjectDescriptions that are not part of this predefined list.

TABLE II

```
public static class ContextObjects
{
    //  (ItemCollection) GetObject(ContextObjects.SelectedItems)
    public static ContextObjectDescription SelectedItems;
        The object that the CommandContext maps to is of type
        ItemCollection, and represents the current selected items
        in the host. These items are the ones the command
        should apply to when invoked.
    //  (Item) GetObject(ContextObjects.FolderItem)
    public static ContextObjectDescription FolderItem;
        The object that the CommandContext maps to is of type Item,
        and represents the currently viewed folder in the command
        host.
    //  (COM Object) GetObject(ContextObjects.ViewSite)
    public static ContextObjectDescription ViewSite;
        This allows the command to talk directly to its command host
        (e.g., it provides a pointer directly to the command host
        implementation). Note that using the ViewSite breaks
        encapsulation, since ideally a command implementation should
        not depend on a specific command host implementation.
}
```

A CommandContext is listed in Table III. The CommandContext is an indexer that maps ContextObjectDescriptions to object values. The CommandContext also has an event that fires when the context has changed. The CommandContext class includes properties, methods, and enumerations that are exposed by command context 140 of FIG. 3, and which can be invoked by command host 130 and/or command broker 132.

TABLE III

```
public delegate void
CommandContextHandler(ContextObjectDescription)
```

TABLE III-continued

```
    This is the event type for a "context changed" event. The
    ContextObjectDescription parameter specifies which object
    in the context actually changed.
public class CommandContext
{
    public event CommandContextHandler ContextChanged;
        Fired when the context changes.
    protected virtual void
OnContextChanged(ContextObjectDescription);
        Fired when the context changes; derived classes should call
        this base implementation.
    public object this[ContextObjectDescription name]
    {
        get;
        set;
    }
        This is the "property bag" for the CommandContext; it maps a
        ContextObjectDescription to a managed object. The type of
        the managed object is a convention established by the provider
        of the ContextObjectDescription.
}
```

A ModeDescription is listed in Table IV. A ModeDescription is a string naming the mode and a managed type. The managed type refers to a requirement, in this example, that the broker return the command provider via the CommandBroker.GetProvider method.

TABLE IV

```
public class ModeDescription
{
    public ModeDescription(string name, Type provider);
    public string Name { get; }
        The name of the mode.
    public Type Provider { get; }
        This is the type that is returned from
        CommandBroker.GetProvider( ) when a broker supports this
        mode.
}
```

A StandardModes class is listed in Table V. In certain embodiments, a list of "standard" modes is available for a command broker to implement. In addition to these standard modes, the set of modes is extensible to include additional modes.

TABLE V

```
public static class StandardModes
{
    static public ModeDescription Collection;    // IEnumerable
    static public ModeDescription Command;       // ICommand
    static public ModeDescription TaskButton;    //
ITaskButtonProvider
}
```

A CommandBroker class is listed in Table VI. The CommandBroker class includes properties, methods, and enumerations that are exposed by command broker 132, and which can be invoked by command host 130 of FIG. 3.

TABLE VI

```
public abstract class CommandBroker
{
    public virtual string identity { get; }
        Defaulting to the name of the most-derived type, this is the
        identity of the command broker. The identity should be
        unique and the command host can determine how its used.
    public virtual CommandContext Context
```

TABLE VI-continued

```
    {
        get;
        set;
    }
    Gets or sets the command context on the command broker.
    The command context is described above.
    public class Group { }
    static public Group Ungrouped;
        In certain implementations, there is just one standard group,
        the "ungrouped" group. Though the command broker and
        command host can extend this list and create new groups
        with their own semantic meaning.
    public virtual IEnumerable Groups        { get; }
        The list of groups, in order of preference, that the
        command broker supports.
    public virtual IEnumerable Modes          { get; }
        The list of modes, in order of preference, that a command
        broker supports.
    public virtual object GetProvider(ModeDescription mode);
        The command provider is the actual command implementation
        for the mode. The command host calls this with a mode
        description supported by this broker, and the broker must
        fulfill the contract by returning the correct type (determined
        by the mode description's "type" field).
    protected CommandContextHandler ContextChangedHandler
    {
        get;
        set;
    }
    This handler processes context-changed events on the
    command broker's context.
}
```

An example of a command provider interface is listed in Table VII. This is the interface for an example command provider 142 of FIG. 3. The example listed is the interface for commands that support the "task button" mode, ITaskButtonProvider. The ITaskButtonProvider includes two strings (ShortTitle and LongTitle) which can be accessed and used by the command host. The ImageSource is the set of instructions that are executed when the command associated with this task button provider is selected by a user. When the command is selected, the set of instructions are invoked by the command host invoking ITaskButtonProvider.Invoke( ).

IProviderChanges is an interface that the command provider can implement to give change notifications to the command host. ProviderChangeHandler is a managed delegate that declares the type of the ProviderChanged event that is fired from within IProviderChanges. The command host can use the ProviderChanged event to tell when it should re-query certain state from the command provider.

For example, if the "ShortTitle" of an ITaskButtonProvider changes (e.g., because the selection changed), then the command provider can inform the command host that its state has changed via the ProviderChanged event. In this example, in response to the user changing the selection by interacting with the UI, the command host changes the "selected" state inside the command context, which causes the command context to fire a change notification to the command provider. The command provider decides that, as a result of this context changed event, it would like to change its ShortTitle, so it fires a ProviderChanged event, which the command host is listening to. The command host receives the ProviderChanged event via a method it has of the type ProviderChangeHandler. The command host, as a result of this event, re-queries the command provider for its ShortText, LongText, IsEnabled, and so forth, obtaining enough information to re-present the command given its new state. The command host uses the new information to update the UI associated with the command.

TABLE VII

```
public delegate void ProviderChangeHandler( );
public interface IProviderChanges
{
    event ProviderChangeHandler ProviderChanged;
}
public interface ITaskButtonProvider
{
    IProviderChanges Changes { get; }
    bool             IsEnabled    { get; }
    string           ShortTitle   { get; }
    string           LongTitle    { get; }
    ImageData        ImageSource  { get; }
    void Invoke( );
}
```

Additionally, a "helper" class can optionally be included that implements the standard logic for writing a command intended to be used in the generic UI command architecture discussed herein. The helper class includes various ones of the interfaces discussed above in a single class to facilitate authoring commands using the generic UI command architecture discussed herein. Command broker authors can then derive from this helper class and override any desired parts of its functionality. Table VIII lists an example helper class ExplorerCommand, which can be used, for example, with the Explorer in different versions of the Windows® operating system.

TABLE VIII

```
public abstract class ExplorerCommand : CommandBroker,
IProviderChanges
{
    public override IEnumerable Modes { get; }
    public override object GetProvider(ModeDescription mode);
    public virtual event ProviderChangeHandler ProviderChanged;
    protected virtual void OnBrokerChanged( );
    protected virtual void Invoke(InvokeDirectives opt, object
args);
    protected virtual VerbDescription verb
    {
        get;
        set;
    }
    protected virtual string ShortTitle
    {
        get;
        set;
    }
    protected virtual ImageData ImageSource
    {
        get;
        set;
    }
    protected virtual bool IsEnabled
    {
        get;
        set;
    }
    protected virtual string LongTitle
    {
        get;
        set;
    }
    protected ItemCollection SelectedItems { get; }
    protected Item FolderItem { get; }
};
```

Command Broker Activation Mechanism

Command broker 132 of FIGS. 2 and 3 can be created in any of a variety of conventional manners. In certain embodiments, a particular command broker activation mechanism that employs an activator is used to create command broker 132, as discussed below. This creation is also referred to as instantiation or construction.

Figure 5:
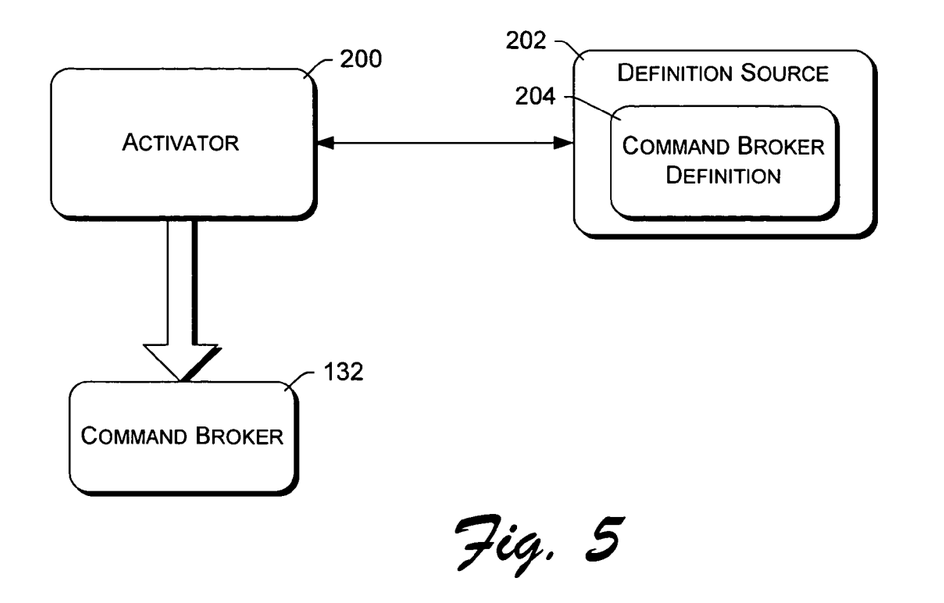
FIG. 5 is a block diagram illustrating example components for creating a command broker.

FIG. 5 is a block diagram illustrating example components for creating a command broker. FIG. 5 illustrates an activator 202 and a definition source 204. Definition source 202 includes a command broker definition 204, which defines how a particular command broker 132 is to be implemented. Activator 202 accesses definition source 202 to retrieve command broker definition 204, then creates command broker 132 as defined in definition 204.

Definition source 202 can be any of a variety of different sources. For example, definition source 202 may be a registry of a Windows® operating system, a database, a file (e.g., in an XML (eXtensible Markup Language) file or some other format), and so forth.

Command broker definition 204 can also take a variety of different forms. In certain embodiments, command broker definition 204 describes one or more objects in terms of their constructor arguments. These object descriptions (which are also referred to herein as key names) describe the objects that are to be instantiated or otherwise created to create command broker 132. Each object description can have zero or more constructor arguments. A constructor argument can be a literal (e.g., a string, a number, an XML document, or a byte array) or a non-literal (e.g., another object description). In situations where an object description has one or more non-literal arguments, each of those non-literal arguments is also instantiated or otherwise created recursively, until all of the objects have been instantiated or otherwise created.

Figure 6:
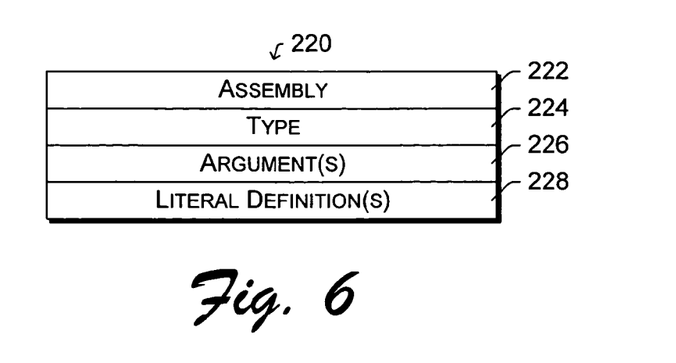
FIG. 6 illustrates an example data structure for an object definition.

FIG. 6 illustrates an example data structure for an object definition 220. One or more such object definitions together make up a command broker definition 204 of FIG. 5. Thus, an example data structure of the command broker is a collection of one or more object definition 200 data structures. Object definition 220 includes an assembly field or portion 222, a type field or portion 224, an argument(s) field or portion 226, and a literal definition(s) field or portion 228. Each of these portions 222, 224, 226, and 228 store various data representing different aspects of the object being defined, as discussed below.

Assembly portion 222 indicates an assembly from which this command broker can be instantiated. In certain implementations, assembly portion 222 indicates the "strong name" of the managed assembly (dll) which contains the code of the command broker to be instantiated. A strong name refers to a name that uniquely identifies an assembly (e.g., on disk) by name, version, public key token, and culture.

Type portion 224 includes an identifier of the object defined by object definition 220. Typically this identifier is an alphanumeric string, although other characters or symbols can alternatively be used as the identifier. Different object definitions within different assemblies can have the same identifier in their respective type portions 224. The identifier in type portion 224, in combination with the assembly in assembly portion 222, allows objects to be uniquely identified.

Arguments portion 226 is included to identify arguments for the object defined by object definition 220. A particular object may not have any arguments, in which case arguments portion 226 need not be included (or may be included but be empty or include an indication that there are not arguments). Arguments, as discussed above, can be literals or non-literals. For each non-literal argument, there is another object definition 220 that defines the object that is that non-literal argument. For each literal argument, there is a definition in literal definitions field 228 that defines that literal (e.g., identifies a particular string, a particular number, a particular XML document, or a particular byte array). If the object defined by object definition 220 does not have any arguments, then literal definitions portion 226 need not be included (or may be included but be empty or include an indication that there are no literals).

Figure 7:
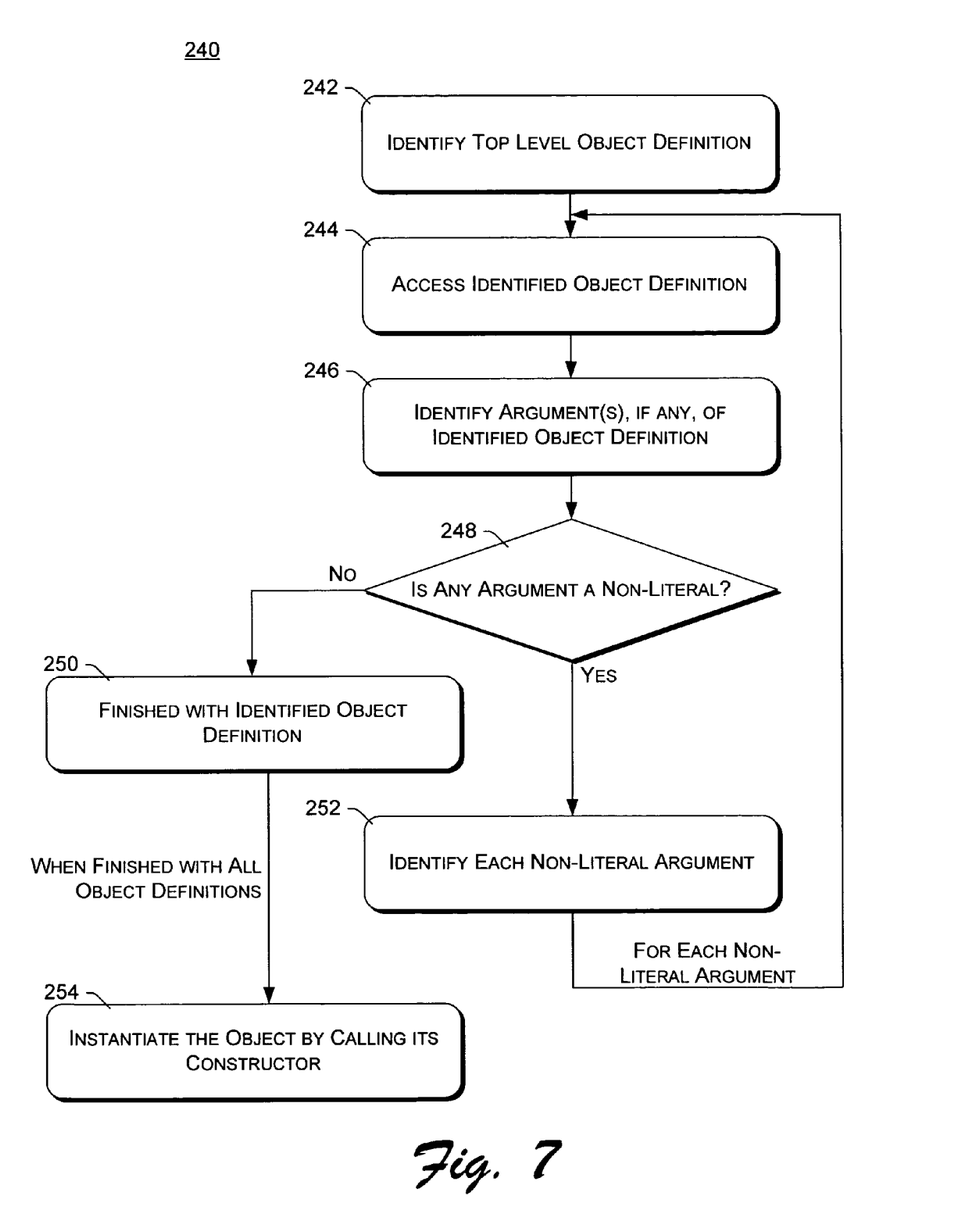
FIG. 7 is a flowchart illustrating an example process for creating a command broker.

FIG. 7 is a flowchart illustrating an example process 240 for creating a command broker. Process 240 is implemented by activator 200 of FIG. 5, and is typically performed in software (although at least a portion of process 240 may alternatively be performed in hardware, firmware, or a combination of hardware, firmware, and software).

Initially, a top-level object definition is identified (act 242). The identified object definition is then accessed (act 244) and any arguments of the identified object definition are identified (act 246). A check is then made as to whether there are any arguments identified in act 246 that are non-literals (act 248). If there are no such arguments (e.g., there are no arguments or all arguments are literals), then process 240 is finished analyzing the identified object definition (act 250). However, if there is at least one argument which is a non-literal, then each of the non-literal arguments is identified (act 252). Each of these non-literal arguments is another object definition. Process 240 then returns to act 244 to analyze each of the identified non-literal arguments. Thus, process 240 continues recursively to analyze each object definition in the command broker definition, until all object definitions are defined in terms of literals (or no arguments). After all object definitions are defined in terms of literals (or no arguments), the individual objects defined by these object definitions, and thus the command broker, are instantiated by calling the constructor for each object (act 254).

Each object thus defined can then be instantiated or otherwise created by working back up through the object definitions. For example, activator 200 can instantiate or otherwise create the objects defined in terms of only literals (or those with no arguments), then use those objects to instantiate or otherwise create other objects that are defined in terms of those objects just instantiated or otherwise created, and so forth. When the top-level object definition has been instantiated, the command broker has been instantiated.

An example of a command definition for a command broker named "FooBroker" is listed in Table IX.

TABLE IX

| Key Name: \Test | | |
|---|---|---|
| Assembly | REG_SZ | FooAssembly |
| Type | REG_SZ | FooBroker |
| Arguments | REG_MULTI_SZ | title, bar |
| title | REG_SZ | Hello, World! |
| Key Name: \Test\bar | | |
| Assembly | REG_SZ | FooAssembly |
| Type | REG_SZ | BarObject |
| Arguments | REG_MULTI_SZ | count, snoo |
| count | REG_DWORD | 0x38 |
| Key Name: \Test\bar\snoo | | |
| Assembly | REG_SZ | FooAssembly |
| Type | REG_SZ | SnooObject |

As can be seen in the example of Table IX, a top-level object definition (or key name) \Test is defined with an assembly portion, a type portion, an arguments portion, and a literals portion (identified as the title line). Each of these portions is a separate line in the top-level object definition example in Table IX. The assembly portion indicates an assembly (FooAssembly) from which to instantiate this command broker. The type portion indicates the object type (FooBroker) defined by this object definition. The arguments portion identifies two arguments (title and bar) for this object definition. Title is a string that is defined in the literal definitions portion, which is the title line of the \Test object definition, as "Hello, World!". The bar argument is another object, which is defined in the next object definition.

During instantiation of the objects, activator 200 of FIG. 5 searches definition source 202 to identify another object definition which is below the top-level object definition \Test, and also is the object definition for the bar object. This object definition is the \Test\bar key name.

The \Test\bar key name is also defined with an assembly portion, a type portion, an arguments portion, and a title portion (each of which is a line in Table IX). The assembly portion indicates an assembly (FooAssembly) from which to instantiate this command broker. This is the same command host as was identified in the top-level key name \Test. The type portion indicates the object type (BarObject) defined by this object definition. The arguments portion identifies two arguments (count and snoo) for this object definition. Count is an integer that is defined in the literal definitions portion, which is the count line of the \Test\bar object definition, as the hexadecimal value "38". The snoo argument is another object, which is defined in the next object definition.

During instantiation of the objects, activator 200 of FIG. 5 searches definition source 202 to identify another object definition which is below the \Test\bar object definition, and also is the object definition for the snoo object. This object definition is the \Test\bar\snoo key name.

The \Test\bar\snoo key name is also defined with an assembly portion and a type portion. The object definition for the snoo object has no arguments, so no arguments portion or literal definitions portion is included in the object definition. The assembly portion indicates an assembly (FooAssembly) from which to instantiate this command broker. This is the same command host as was identified in the top-level key name \Test and the \Test\bar key name. The type portion indicates the object type (SnooObject) defined by this object definition.

Table X lists an example API that supports the command broker activation discussed herein. Each object definition or key name discussed above is encapsulated by an IActivationDefinition interface listed in Table X. The assembly field and type field are both properties of the IActivationDefinition interface. Each argument and literal definition, when present, is an IDefinitionElement.

TABLE X

```
public interface IDefinitionAnalyzer
{
    IDefinitionElement AnalyzeDefinition(IActivationDefinition def);
    IDefinitionElement AnalyzeObject(object o);
    object GetObject(IDefinitionElement activated);
}
public interface IActivationDefinition
{
    string Assembly              { get; }
    string Type                  { get; }
    IDefinitionElement [] ActivateArguments(IDefinitionAnalyzer a);
}
public interface IDefinitionElement
{
    //
    // empty interface to serve as an encapsulating
    // mechanism for the analyzers to have their own
    // set of object definitions
    //
};
```

Example Computer Environment

Figure 8:
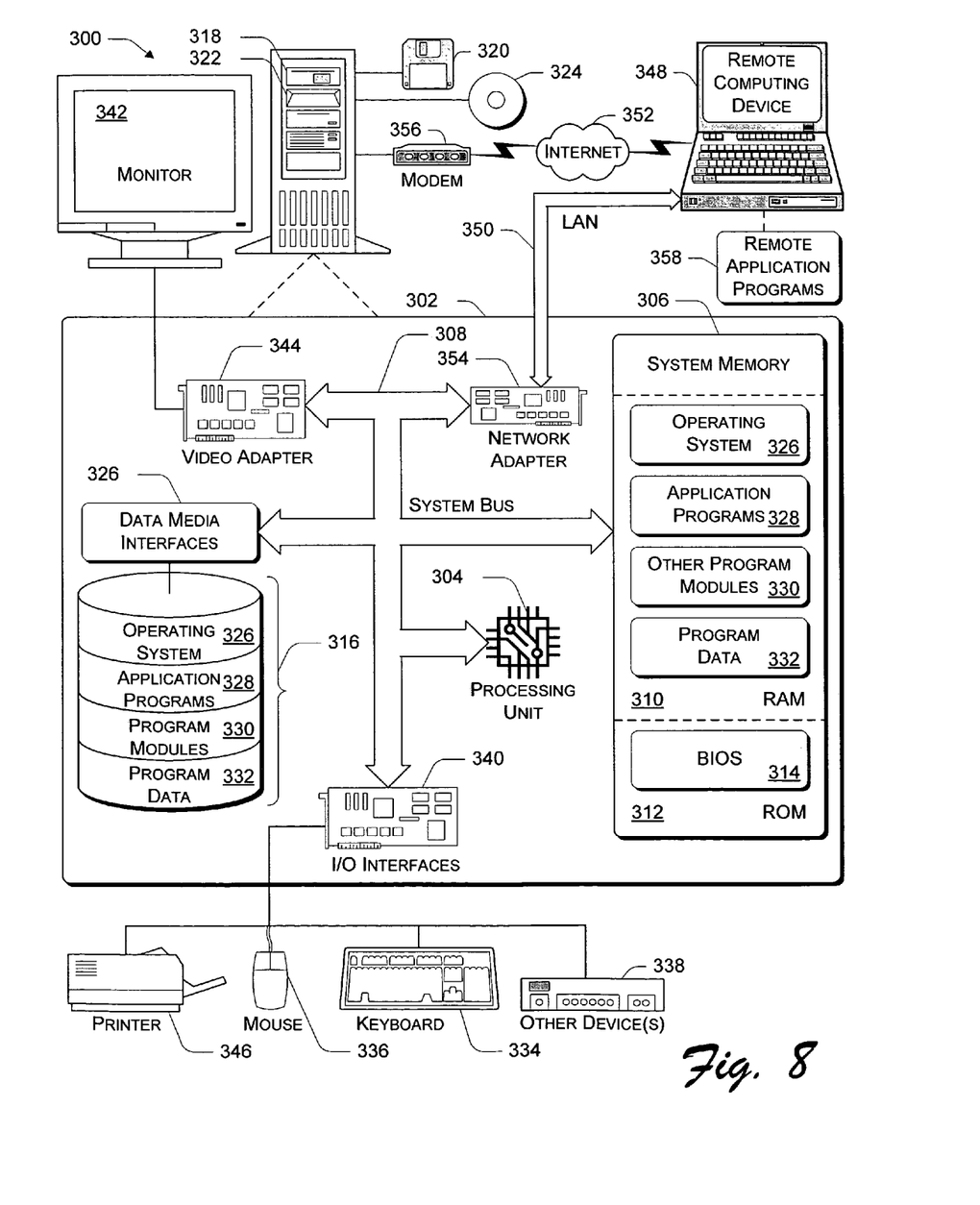
FIG. 8 illustrates a general computer environment, which can be used to implement the techniques described herein.

FIG. 8 illustrates a general computer environment 300, which can be used to implement the techniques described herein. The computer environment 300 is only one example of a computing environment and is not intended to suggest any limitation as to the scope of use or functionality of the computer and network architectures. Neither should the computer environment 300 be interpreted as having any dependency or requirement relating to any one or combination of components illustrated in the exemplary computer environment 300.

Computer environment 300 includes a general-purpose computing device in the form of a computer 302. Computer 302 can be, for example, a computing device 102 of FIG. 1. Computer 302 can also be an encoder device that is the source of a multimedia presentation. The components of computer 302 can include, but are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media can be any available media that is accessible by computer 302 and includes both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 8 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 326. Alternatively, the hard disk drive 316, magnetic disk drive 318, and optical disk drive 322 can be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 316, magnetic disk 320, optical disk 324, ROM 312, and/or RAM 310, including by way of example, an operating system 326, one or more application programs 328, other program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device can also be connected to the system bus 308 via an interface, such as a video adapter 344. In addition to the monitor 342, other output peripheral devices can include components such as speakers (not shown) and a printer 346 which can be connected to computer 302 via the input/output interfaces 340.

Computer 302 can operate in a networked environment using logical connections to one or more remote computers, such as a remote computing device 348. By way of example, the remote computing device 348 can be a personal computer, portable computer, a server, a router, a network computer, a peer device or other common network node, and the like. The remote computing device 348 is illustrated as a portable computer that can include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which can be internal or external to computer 302, can be connected to the system bus 308 via the input/output interfaces 340 or other appropriate mechanisms. It is to be appreciated that the illustrated network connections are exemplary and that other means of establishing communication link(s) between the computers 302 and 348 can be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, or program modules. Communication media also includes any information delivery media but excludes signal bearing media. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable storage media having stored thereon a plurality of instructions that, when executed by one or more processors, causes the one or more processors to:

create a command broker by:
identifying an object definition that includes one or more arguments;
for each of the one or more arguments that is a non-literal argument,
recursively identifying one or more additional object definitions based on the argument; and
creating, as the command broker, the objects defined by the identified object definitions;

negotiate, with the command broker, for a presentation model to be used in presenting a command via a user interface, the negotiating including obtaining a list of one or more presentation models supported by the command broker and selecting at least one of the one or more presentation models that is supported by the command broker;

notify the command broker of the selected at least one presentation model, the notifying including invoking a GetProvider method exposed by the command broker and including the selected at least one presentation model as a parameter of the GetProvider method;

obtain, based on the negotiated presentation model, a command provider associated with the command;

wherein the command broker is an intermediary between a command host and the command provider; and wherein the command provider is the final handler for a particular command.

2. One or more computer readable storage media as recited in claim 1, wherein the instructions further cause the one or more processors to interact with the command provider to present the command's user interface in response to the command being subsequently invoked by a user.

3. One or more computer readable storage media as recited in claim 1, wherein the instructions further cause the one or more processors to make context information available to the command broker.

4. One or more computer readable storage media as recited in claim 1, wherein the plurality of instructions further cause the one or more processors to:

negotiate, with a plurality of additional command brokers, for presentation models to be used in presenting a plurality of additional commands associated with the plurality of additional command brokers; and obtain, based on the negotiated presentation models, identifiers of a plurality of additional command providers associated with the plurality of additional commands.

5. One or more computer readable storage media as recited in claim 1, wherein the plurality of instructions are part of a command host that supports one or more presentation models not supported by the command broker.

6. One or more computer readable storage media as recited in claim 1, wherein the instructions that cause the one or more processors to negotiate with the command broker further cause the one or more processors to:

access a modes enumeration exposed by a component; and receive, in response to accessing the modes enumeration, a list of a plurality of different presentation models supported by the command broker for the command.

7. One or more computer readable storage media having stored thereon a plurality of instructions that implement a command broker, the plurality of instructions, when executed by one or more processors, causes the one or more processors to:

identify, to a requestor, a plurality of presentation models supported by the command broker, the command broker being associated with a particular command and being created by:

identifying an object definition that includes one or more arguments;

for each of the one or more arguments that is a non-literal argument, recursively identifying one or more additional object definitions based on the argument; and creating, as the command broker, the objects defined by the identified object definitions;

negotiate, with the requestor, which of the plurality of presentation models is to be used to present the command via a user interface, the negotiating including providing a list of the plurality of presentation models supported by the command broker and receiving a selection of at least one of the plurality of presentation models that is supported by the command broker;

receive a notification, from the requestor, of the selected at least one presentation model, the receiving including invocation of a GetProvider method exposed by the command broker and including the selected at least one presentation model as a parameter of the GetProvider method;

wherein the command broker is an intermediary between a command host and a command provider; and wherein the command provider is the final handler for a particular command.

8. One or more computer readable storage media as recited in claim 7, wherein the plurality of instructions further cause the one or more processors to:

create, based on the negotiated presentation model, the command provider for the command; and notify the requestor of the command provider.

9. One or more computer readable storage media as recited in claim 8, wherein the instructions that cause the one or more processors to create the command provider comprise instructions that cause the one or more processors to instantiate the command provider.

10. One or more computer readable storage media as recited in claim 7, wherein the plurality of instructions further cause the one or more processors to:

access a command context; and determine, based at least in part on the command context, which of the plurality of presentation models supported by the command broker to identify to the requestor.

11. One or more computer readable storage media as recited in claim 7, wherein the instructions that cause the one or more processors to negotiate which of the plurality of presentation models is to be used to present the command comprise instructions which cause the one or more processors to receive, from the requestor, an identification of one of the plurality of presentation models.

12. One or more computer readable storage media as recited in claim 7, wherein the requestor comprises the command host.

13. One or more computer readable storage media as recited in claim 7, wherein the plurality of instructions further cause the one or more processors to:

expose a modes enumeration; and identify the plurality of presentation models supported by the command broker by returning to the requestor, in response to the requestor invoking the modes enumeration, a list of the plurality of presentation models supported by the command broker.

14. A system including at least one processor, comprising:

a command host to provide a workspace where a plurality of user interface commands can be presented;

a command broker, communicatively coupled to the command host, to identify a plurality of supported modes for a command, and further to negotiate with the command host to determine which of the plurality of supported modes is to be used for the command, the negotiating including providing a list of the plurality of supported modes and receiving a selection of at least one of the supported modes, the command broker further being created by:

identifying an object definition that includes one or more arguments;

for each of the one or more arguments that is a non-literal argument, recursively identifying one or more additional object definitions based on the argument; and creating, as the command broker, the objects defined by the identified object definitions;

receive a notification of the selected at least one supported modes, the receiving including invocation of a GetProvider method exposed by the command broker and including the selected at least one presentation model as a parameter of the GetProvider method;

presenting one or more commands on a computing device;

wherein the command broker is an intermediary between the command host and a command provider; and wherein the command provider is the final handler for a particular command.

15. A system as recited in claim 14, further comprising: a plurality of additional command brokers communicatively coupled to the command host, each of the plurality of additional command brokers to identify multiple supported modes for one of a plurality of different commands, and each of the plurality of additional command brokers further to negotiate with the command host to determine which of the multiple supported modes is to be used for the particular command.

16. A system as recited in claim 14, further comprising: a command provider, created by the command broker based on the determined mode to be used for the command, to control actions that are followed when the command is invoked.

17. A system as recited in claim 14, further comprising:

a command context, communicatively coupled to the command broker, identifying information regarding the system that can be used by the command broker.

* * * * *